(No Model.)
G. H. CORLISS, Dec'd.
E. A. CORLISS, Administratrix.
MACHINE FOR FITTING THE EXHAUST VALVE BOXES OF STEAM ENGINES.
No. 450,403. Patented Apr. 14, 1891.
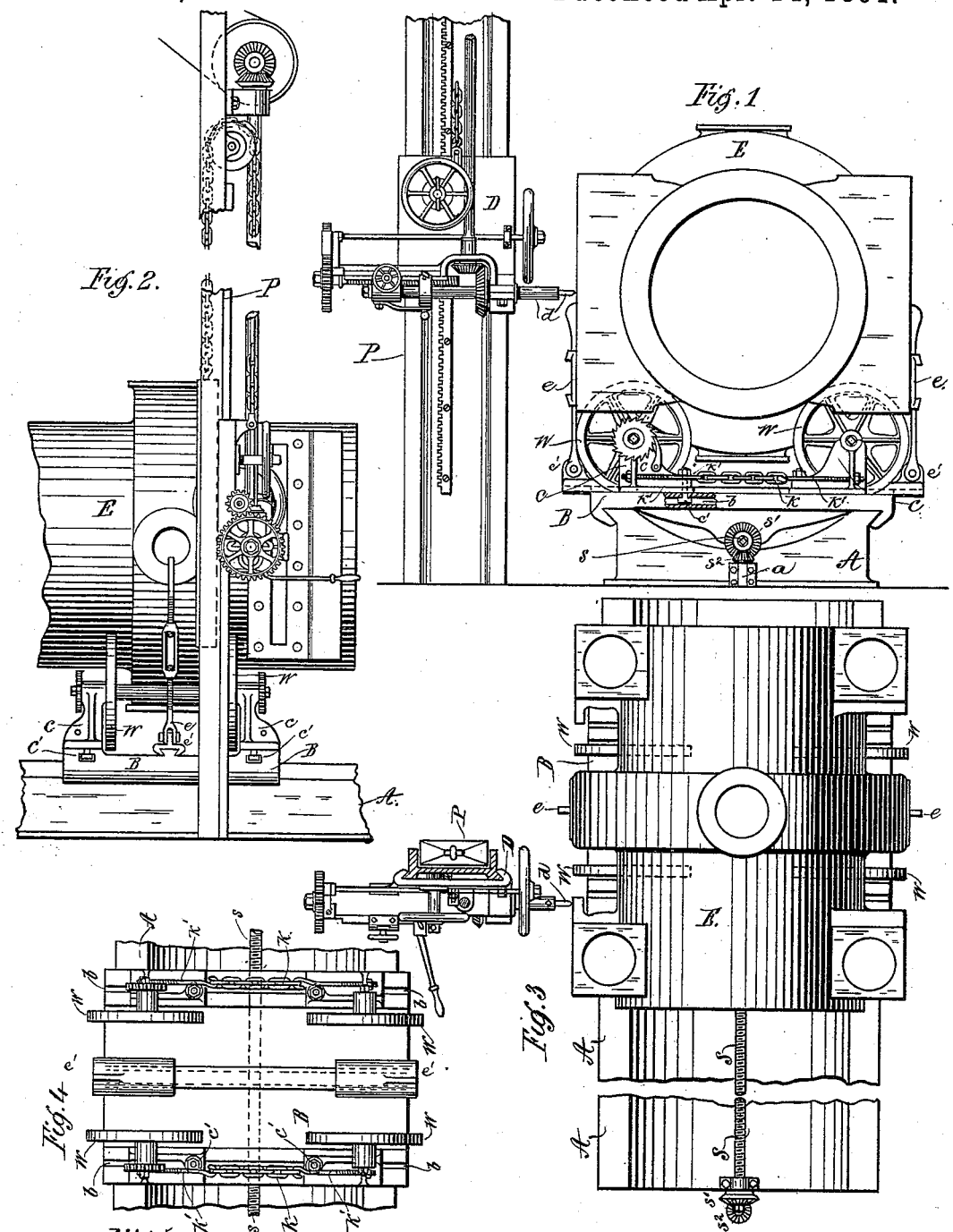

United States Patent Office.

EMILY A. CORLISS, OF PROVIDENCE, RHODE ISLAND, ADMINISTRATRIX OF GEORGE H. CORLISS, DECEASED.

MACHINE FOR FITTING THE EXHAUST-VALVE BOXES OF STEAM-ENGINES.

SPECIFICATION forming part of Letters Patent No. 450,403, dated April 14, 1891.

Application filed December 16, 1889. Renewed November 6, 1890. Serial No. 370,454. (No model.)

*To all whom it may concern:*

Be it known that GEORGE H. CORLISS, deceased, late a citizen of the United States, and a resident of the city and county of Providence, in the State of Rhode Island, (represented by EMILY A. CORLISS, administratrix,) invented a new and useful machine for fitting the exhaust-valve boxes of steam-cylinders for the attachment thereto of the feet or cylinder-supports, of which the following is a specification.

Prior to the present invention of said GEORGE H. CORLISS he had, in drilling and tapping the exhaust-valve boxes of steam-cylinders for the attachment thereto of the feet or cylinder-supports, used in combination with a horizontal drill gibbed and adjustable vertically upon upright posts a table mounted upon wheels and movable by means of a pinch-bar to and fro along parallel tracks located in front of and at right angles to the axis of said drill, a rack and pinion serving to steady said table and hold it in position. The cylinder was placed upon its side and rested upon parallel blocking laid upon the table in front of the drill and was squared and clamped at right angles to the drill axis. After the cylinder was adjusted and secured upon the table the latter was by means of the pinch-bar moved along the track to bring the cylinder into position for drilling and tapping one series of holes in the bottom of the valve-box, and was again moved in the same manner to bring the cylinder into position for drilling and tapping the next series of holes. When necessary, the cylinder was by means of cranes lifted from the table and turned axially to present another face to the drill, after which it was replaced and readjusted upon the table and again squared and clamped as before. That method required several workmen to operate the crane and turn and replace the cylinder upon the table for each operation of the drill, and the handling and drilling of the cylinder consumed necessarily a great deal of time.

The objects of the present invention are to provide means for accurately adjusting and carrying the cylinder at right angles to the drill axis during the operation of drilling and tapping it for attachment of the cylinder-supports, and also means for revolving the cylinder axially with a minimum of delay and manual labor, while maintaining with sufficient accuracy in all positions its adjustment relative to the drill.

A carriage is gibbed upon a stationary bed and arranged to slide longitudinally thereon as moved by a feed-screw. Four wheels each arranged to revolve upon a horizontal shaft are journaled upon upright posts or bracket-supports mounted upon said carriage and each movable laterally thereon for adjustment of its wheel relatively to the diametrically-opposite wheel. Means are provided for securing the bracket-supports in place after their adjustment. The cylinder rests upon the peripheral face of said wheels and is revolved axially thereon, said wheels rotating as the cylinder is revolved and steadying it and preserving its alignment and adjustment.

In the accompanying drawings, Figure 1 is a side elevation of the invention with a cylinder supported thereon; Fig. 2, a rear elevation of same with cylinder partially broken away. Fig. 3 is a top plan with a cylinder in place. Fig. 4 is a top plan of the carriage, supporting-wheels, and a portion of the stationary bed.

Similar letters of reference indicate like parts where they occur in the drawings.

A represents the stationary bed, and B the carriage gibbed thereon and moved longitudinally along said bed by means of the feed-screw $s$, operated by bevel-gears $s'$ $s^2$ from shaft $a$ driven by power. The bracket-supports or upright posts $c$ $c$ $c$ $c$, each provided with a broad base, are movable transversely of the carriage, and when adjusted are held firmly in position by means of inverted-T bolts $c'$ $c'$, which are movable in transverse slots $b$ $b$ in the carriage, and each extending upward through the hole or slot in the base of the corresponding support are threaded at the upper end to receive a nut. Upon each support $c$ is journaled the horizontal shaft of a wheel $w$. Each two diametrically-opposite wheels $w$ $w$ are made to approach or recede from each other to receive cylinders E of different diameters by the adjustment of their respective supports $c$ $c$, which are adjustably secured by a chain $k$ and links $k'$, which latter are each threaded to receive a nut.

D represents a tool-rest vertically adjustable upon the upright post P, whereby the drill $d$ is raised or lowered, as may be necessary in drilling and to enable the tool to work on cylinders of different sizes or diameters. By substituting a tap for the drill the holes are threaded. Adjustable shackles $e$ $e$, sometimes known as "turn-buckles," extending upward from adjustable slides $e'$ $e'$, fitted on a dovetail transverse way on the carriage and each provided with a stout hook to engage in the side flange of the cylinder, serve also to steady the cylinder during the operations of drilling and tapping.

In practical operation of this invention, the supports $c$ $c$ and their wheels $w$ $w$ being adjusted to receive a cylinder of any particular diameter, the cylinder E is raised by a crane and placed upon the wheels and the operations of drilling and tapping for the attachment of the cylinder-feet are completed without removing the cylinder or changing its adjustment. The cylinder is revolved axially, as may be needed to present different faces to the drill and tap.

The cylinder when taken from this machine is fitted to receive the feet or cylinder-supports, which are to be bolted upon the bottom of the exhaust-valve boxes.

I claim as the invention of said GEORGE H. CORLISS and desire to secure by these Letters Patent—

1. In a machine for fitting the exhaust-valve boxes of steam-cylinders for attachment thereto of the cylinder-feet, the combination and arrangement in a single machine of a tool-carriage D, vertically adjustable upon an upright post P, whereby the drill-arbor is raised and lowered in a plane at right angles to the center line of the cylinder, the carriage B, having upright supports $c$, adjustable transversely thereof, and wheels $w$, journaled on said supports, and means for securing said supports and wheels in the required positions with a stationary bed A and a feed-screw, as $s$, operated by power, whereby said carriage is turned longitudinally of the bed A, the whole arranged as shown and described, and adapted to serve, as specified, to fit the cylinder for its feet without readjustment of the cylinder.

2. The carriage B, upright supports, as $c$, adjustable transversely of said carriage, wheels, as $w$, journaled upon said supports and adjustable therewith, and means, as the inverted-T bolts $c'$, links $k'$, and chain $k$ for securing said supports in the required positions, combined with each other and with a stationary bed, as A, and feed-screw $s$, driven by power, all substantially as herein specified.

In testimony whereof I have subscribed my name hereto in presence of two witnesses.

EMILY A. CORLISS,
*Administratrix of the estate of George H. Corliss, deceased.*

Witnesses:
HENRY MARSH, Jr.,
MARIA L. CORLISS.